US006408978B1

(12) United States Patent
Premus

(10) Patent No.: US 6,408,978 B1
(45) Date of Patent: Jun. 25, 2002

(54) NON-ACOUSTIC SELF NOISE CANCELLER FOR SENSOR ARRAYS

(75) Inventor: Vincent E. Premus, Pepperell, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 4 days.

(21) Appl. No.: 09/662,986

(22) Filed: Sep. 15, 2000

(51) Int. Cl.[7] .............................. G01V 1/04; G01V 1/38

(52) U.S. Cl. ...................... 181/120; 181/114; 367/20; 367/21

(58) Field of Search ................................. 181/120, 114, 181/110, 112, 122; 367/141, 177, 901, 905, 106, 130, 154, 20, 21

(56) References Cited

U.S. PATENT DOCUMENTS

| | | | |
|---|---|---|---|
| 3,599,142 A | 8/1971 | Rust | |
| 3,860,899 A | 1/1975 | Watlington | |
| 4,388,711 A | 6/1983 | Fay | |
| 4,821,241 A | 4/1989 | Berglund | |
| 4,890,264 A | * 12/1989 | Crews et al. | 181/112 |
| 5,528,555 A | * 6/1996 | Santos et al. | 367/106 |
| 5,532,979 A | 7/1996 | Hansen et al. | |
| 5,572,483 A | * 11/1996 | Chambers et al. | 367/21 |
| 5,780,784 A | * 7/1998 | Robbins | 175/40 |

FOREIGN PATENT DOCUMENTS

GB 2229892 A 3/1990

OTHER PUBLICATIONS

Daubin, S C, "Long Range Acoustic Propagation Research and Development." Gulf Universities Research Consortium Tech. Rept. No. 125, prepared for Office of Naval Research, Jan., 1973, 33 pages.

Bedenbender, J W, Johnston, R C, Netizel E B, "Electroacoustic Characteristics of Marine Seismic Streamers," Geophysics, 35(6), Dec., 1970, pp. 1054–1072.

Widrow, B, et al., "Adaptive Noise Cancelling: Principals and Applications," Proc. IEEE, Dec., 1975, pp. 1692–1716.

Prandtl, L, "The Generation of Vortices in Fluids of Small Viscosity," J. Royal Society of London, Dec. 1927, pp. 720–741.

Cummings, T R, "SAIC Quiet Cable," Proc. OCEANS '89, Sep., 1989, pp. 1456–1459.

Berlin, S., "Final Report ONR/Hughes High Speed Towed Array System (HSTAS)", Submitted to Office of Naval Research, Reporting Period ending Sep. 1977, pp. 1–66.

Griffin, Owen M. et al., "Vortex Shedding from a Cylinder Vibrating in Line with An Incident Uniform Flow", Naval Research Laboratory, J. Fluid Mech. (1976), vol. 75, Part 2, pp. 257–271.

Ketchman, Jeffrey, "Vibration Induced in Towed Linear Underwater Array Cables", IEEE Journal of Oceanic Engineering, vol. OE–6, No. 3, Jul. 1981, pp. 77–87.

(List continued on next page.)

Primary Examiner—Robert E. Nappi
Assistant Examiner—Edgardo San Martin
(74) Attorney, Agent, or Firm—Daly, Crowley & Mofford, LLP

(57) ABSTRACT

A device for canceling non-acoustic self-noise associated with mechanically induced vibrations in sensor arrays and associated methods are described. The method utilizes the isolation of a vibration reference via digital beamforming to non-acoustic wavenumber space. This technique produces an interference reference measurement which is sensitive only to vibrations propagating within an array body and independent of acoustic signals propagating in surrounding medium.

20 Claims, 8 Drawing Sheets

OTHER PUBLICATIONS

Hull, Andrew J., "A Technique to Measure the Breathing Wave Speed in a Towed Array", Journal of Vibration and Acoustics, Technical Briefs, Apr. 1994. vol. 116, pp. 243–245.

Kennedy, Robert M., "Towed Array Hydroacoustic Design", Naval Underwater Systems Center, pp. 380–385.

Nishi, R. Y., et al. "Measurement of Noise of An Underwater Towed Body", The Journal of the Acoustical Society of America, Nov. 17, 1969, pp. 753–758.

"Adaptive Noise Cancellation At Plessey", AD–A270 696 Bulletin, Office Of Naval Research European Office, Jan. 31,1989, 2 pgs.

* cited by examiner

NON-ACOUSTIC SELF NOISE CANCELLER FOR SENSOR ARRAYS

STATEMENTS REGARDING FEDERALLY SPONSORED RESEARCH

This invention was made with government support under Contract No. F19628-95-C-0002 awarded by the Air Force. The government has certain rights in the invention.

CROSS-REFERENCE TO RELATED APPLICATIONS

Not Applicable.

FIELD OF THE INVENTION

This invention relates noise cancellation and more particularly to technique and apparatus for canceling non-acoustic self noise associated with mechanically induced vibrations.

BACKGROUND OF THE INVENTION

As is known in the art, a towed-array type of sonar system typically includes an array of sensors, such as hydrophones which are physically coupled by a first line or cable (e.g. a fluid-filled hose) which is typically provided from a material having strength suitable to pull the array and typically of neutral buoyancy. A second line or cable (again provided from a suitable material) physically couples the first line, and hence the array of sensors, to a tow vehicle (e.g. a ship) which tows the sensor array through a medium such as water.

As is also known, a sonar array towed through a medium in this manner typically generates non-acoustic noise referred to as non-acoustic self noise. Self-noise is generally due to mechanical vibrations induced by hydrodynamic flow over the array sensors as the array is towed through the medium in which it is disposed. The vibrations propagate as transverse and longitudinal modes in the array body, much like a vibrating string with fixed boundary conditions. The vibrations produce local accelerations at each sensor (e.g. the pressure head of a hydrophone). The acoustic response-induced by this phenomenon can be several orders of magnitude stronger that that of acoustic signals propagating through the water column.

Such non-acoustic self-noise observed on sonar towed arrays can unnecessarily prevent the detection and discrimination of acoustic signatures at low frequency, and thus can impose limits on system performance beyond those implied by the ambient acoustic noise environment. Interference resultant from non-acoustic self-noise tends to dominate the dynamic range of the equipment (e.g. a lofargram display) used by a sonar analyst to classify signatures.

Various strategies have been used to overcome the limitations due to self noise. For example, mechanical self-noise suppression techniques such as vibration isolation and cable fairing are capable of attenuating the propagation of vibrations in the array body. These approaches usually require a mechanical connection or physical alteration to the first cable which couple the array of sensors together and to the to cable which couples the array of sensors to the tow vehicle.

Also, signal processing techniques such as noise spectrum equalization are also employed to provide some dynamic range compression at the display level. However, this approach is an incoherent technique, i.e. ignores phase, and thus comes at some cost to signal of interest (SOI) detectability.

It would therefore, be desirable to provide a system which rejects vibrational self-noise without requiring added sensors or external connections to the sensor array or to cables coupled to the sensor array.

SUMMARY OF THE INVENTION

In accordance with the present invention, a device for canceling non-acoustic self-noise associated with mechanically induced vibrations in a sensor array includes an acoustic signal-processing path having an input coupled to the sensor array and adapted to detect signals having a first predetermined range of phase speed, a noise signal processing path coupled to the sensor array and adapted to detect signals having a phase speed (or phase speeds) which is (are) different than the first predetermined phase speed such that the noise signal processing path isolates vibrational noise from the sensor array and a combiner circuit coupled to receive a first signal from the acoustic signal-processing path and a second signal from the noise signal-processing path and for combining the first and second signals to produce a clean output signal.

With this particular arrangement, a device which rejects vibrational self-noise is provided. The non-acoustic noise canceller coherently rejects vibrational self-noise by recognizing that most vibrational modes of a towed sensor array propagate at phase speeds substantially less than that of information-bearing acoustic signals in a water column. This permits the formation of an adaptive interference reference beam steered to non-acoustic wavenumber space, or that part of frequency-wavenumber space within which the signal of interest is known not to exist. It should be appreciated that the present invention will work with any array subject to mechanical vibrations or other high wavenumber noise relative to the signal of interest. Thus, a signal-free, interference reference beam is formed from the same sensor which samples the data, with no need for additional measurement channels such as accelerometers or strain gauges to independently sense the undesirable distortions caused by cable strumming. The reference beam should always be directed into non-acoustic space to avoid injection of acoustic artifacts into water-borne acoustic cone. In one embodiment, the reference beam is directed along an axis of the sensor array (i.e. the reference beam is provided as an end-fire beam), tuned to phase speed of 1000 m/s.

In a further embodiment, the device includes a plurality of acoustic signal-processing paths and one or more noise signal processing paths each of which are coupled to the sensor array. Each of the acoustic signal-processing paths are adapted to detect signals having a first predetermined range of phase speed; while each of the one or more noise signal processing paths are adapted to detect signals having a range of phase speed which is different than the first predetermined phase speed. In this manner, each of the one or more noise signal processing paths isolates vibrational noise from the sensor array.

The recognition that most vibrational modes of an array (e.g. a sonar array) propagate at a phase speed substantially less than that of acoustic signals in the water column which permits the formation of an adaptive interference reference beam steered to non-acoustic wavenumber space leads to the architecture. Such an architecture provides for the coherent cancellation of non-acoustic self-noise.

In accordance with a further aspect of the present invention, a method for canceling non-acoustic self-noise associated with mechanically induced vibrations in a sensor array includes the steps of: (a) providing two or more signals from the sensor array to an input of an acoustic signal processing path, (b) weighting the signal with a first set of weighting coefficients selected to form a first beam to detect signals at a particular arrival angle relative to the sensor array (c) providing two or more signals from the sensor array to an input of a noise signal-processing path; and (d) weighting the two or more signals with a second different set of weighting coefficients selected to isolate signals having a phase speed different than the phase speed of the signals detected by the first beam. The method utilizes the isolation of a vibration reference via digital beamforming to non-acoustic wavenumber space. This attribute forms the basis for the method which produces an interference reference measurement which is sensitive only to vibrations propagating within an array body and independent of acoustic signals propagating in surrounding medium. The approach is distinguished from the prior art in that reference isolation requires no extraneous sensors such as acclerometers, strain gauges, or fiber optic or piezoelectric sensing devices. The approach is also distinguished from the prior art in that it is aimed at canceling self-noise induced by hydrodynamic flow over the body of the sensor array itself, not own-ship radiated propulsion or machinery noise. In one embodiment, the cancellation system employs an adaptive sidelobe canceller, to coherently subtract an appropriately weighted function of the vibration reference measurement from the acoustic channel of interest. The technique of the present invention thus exploits phase and the propagation physics underlying sensor array-borne mechanical vibrations to spatially reject this form of broadband interference. Specifically, it has been recognized that most vibrational modes of an array (e.g. a sonar array) propagate at a phase speed substantially less than that of acoustic signals in the water column. This permits the formation of an adaptive interference reference beam steered to non-acoustic wavenumber space.

It should be appreciated that the apparatus and method described herein, while explained in the context of passive processing of sonar towed array data subject to cable strum self-noise, also find application in a wide variety of areas including but not limited to: (1) cable strum rejection in towed arrays used in marine seismic prospecting or active sonar processing in general; (2) cable strum rejection for vertical line arrays subject to ocean currents used in systems for global monitoring ocean temperature using acoustic transmissions; (3) ground roll rejection in near-surface seismic exploration for characterization of underground structures, mine detection, and archeological investigation; and (4) vibration rejection in multimedia microphone arrays used in speaker recognition and isolation

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
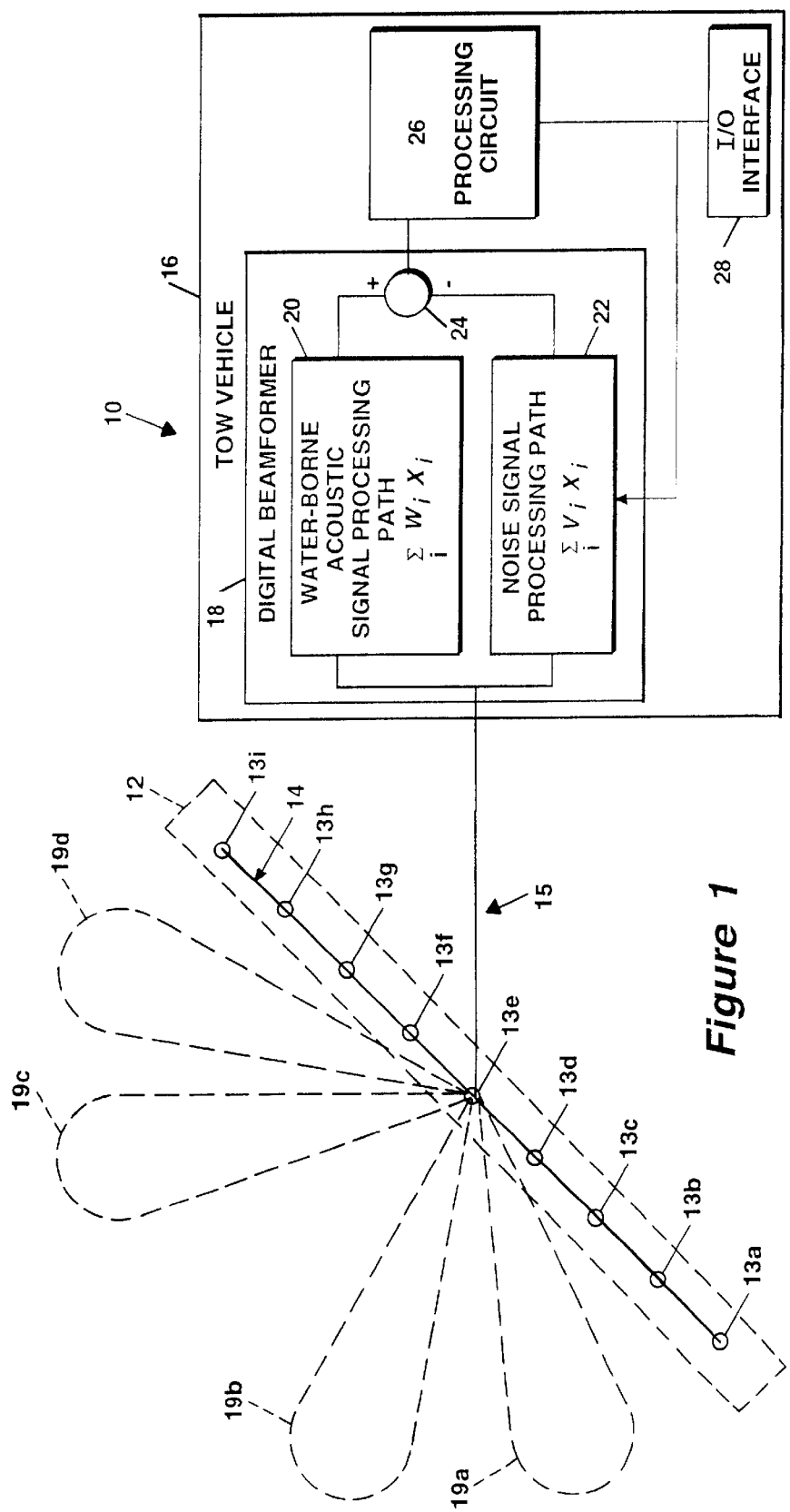
FIG. 1 is a block diagram of a sonar system which includes a non-acoustic self-noise canceller.

Referring now to FIG. 1, a sonar system 10 includes a sensor array 12 provided from a plurality of sensors 13a–13i. Those of ordinary skill will appreciate that although the sensor array 12 is here shown as a linear array provided from nine sensors, the inventive concepts explained herein below apply equally well to sensor arrays having fewer or greater than nine sensors and having array shapes which are different than linear. The sensors 13a–13i are physically coupled by a first cable or line 14. A second cable 15 couples the sensor array 12 to a tow vehicle which pulls the sensor array through a medium.

In one embodiment, the sensor array 12 is provided as a sonar array 12 and the sensors 13a–13i are each provided as hydrophones. In this case, the sonar array is disposed in a body of water and the tow vehicle 16 corresponds to a ship. It should be appreciated that other sensors such as particle velocity sensors may also be used. It should be further understood that the present invention finds use in a variety of applications including but not limited to ground-roll cancellation in near surface seismology and vibration cancellation in microphone arrays. It should also be appreciated that other sensors such as particle velocity sensors may also be used.

In operation, when the vehicle 16 tows the sensor array 12 through the medium, hydrodynamic flow over the array leads to vortex shedding which induces mechanical vibrations, herein referred to as non-acoustic self noise. The vibrations propagate as transverse and longitudinal modes in the array 12, much like a vibrating string with fixed boundary conditions. The vibrations produce local accelerations at each sensor 13a–13i. The acoustic response induced by this phenomenon can be several orders of magnitude stronger that that of acoustic signals propagating through the medium thereby dominating the equipment used by a sonar analyst to identify contacts.

Signals from the sensor array 12 are provided via an electrical signal path to a digital beam former circuit 18. In one embodiment, the electrical signal path is included as part of cables 14 and 15. The digital beamformer 18 receives the signals fed thereto from the sensor array 12 and forms one or more beams 19a–19d through which signals of interest are received. The beams are formed using conventional or adaptive techniques well known to those of ordinary skill in the art. Although four beams are here shown, those of ordinary skill in the art will also appreciate that beamformer 18 can form fewer or greater than four beams and that the beams can point in any desired direction and not just in the directions shown in FIG. 1.

The signal from the sensor array 12 is fed to both an acoustic signal processing path 20 and a noise signal processing path 22. Each of the paths 20, 22 constitutes a different weighted combination of measurements. Noise signal path 22 isolates the source of non-acoustic self-noise while acoustic path 20 receives the signal of interest which includes the non-acoustic self-noise signal.

It should be appreciated that in accordance with the present invention it has been recognized that the phase speed of the noise signal propagates at a speed which is different than the phase speed of the signal of interest. Thus, when computing the appropriate weights for each of the acoustic and noise signal paths, the phase speed of the respective signals are utilized in the computations, in particular for the computation of complex weighting coefficients $W_i$ and $V_i$ in FIG. 1.

The signals from paths 20, 22 are fed to the input of a combiner circuit 24. Combiner circuit 24 combines the signals from each of the paths 20, 22 and provides an output signal corresponding to the signal of interest with the non-acoustic self-noise signal removed therefrom.

The output signal is then fed to a processing circuit 26 for further processing, such as noise spectrum equalization, filtering, or display mapping. An input/output (I/O) interface 28 coupled to the processing circuit 26 provides information to a user. The I/O Interface may include for example, a lofargram display used by a sonar analyst to classify signatures.

Figure 2:
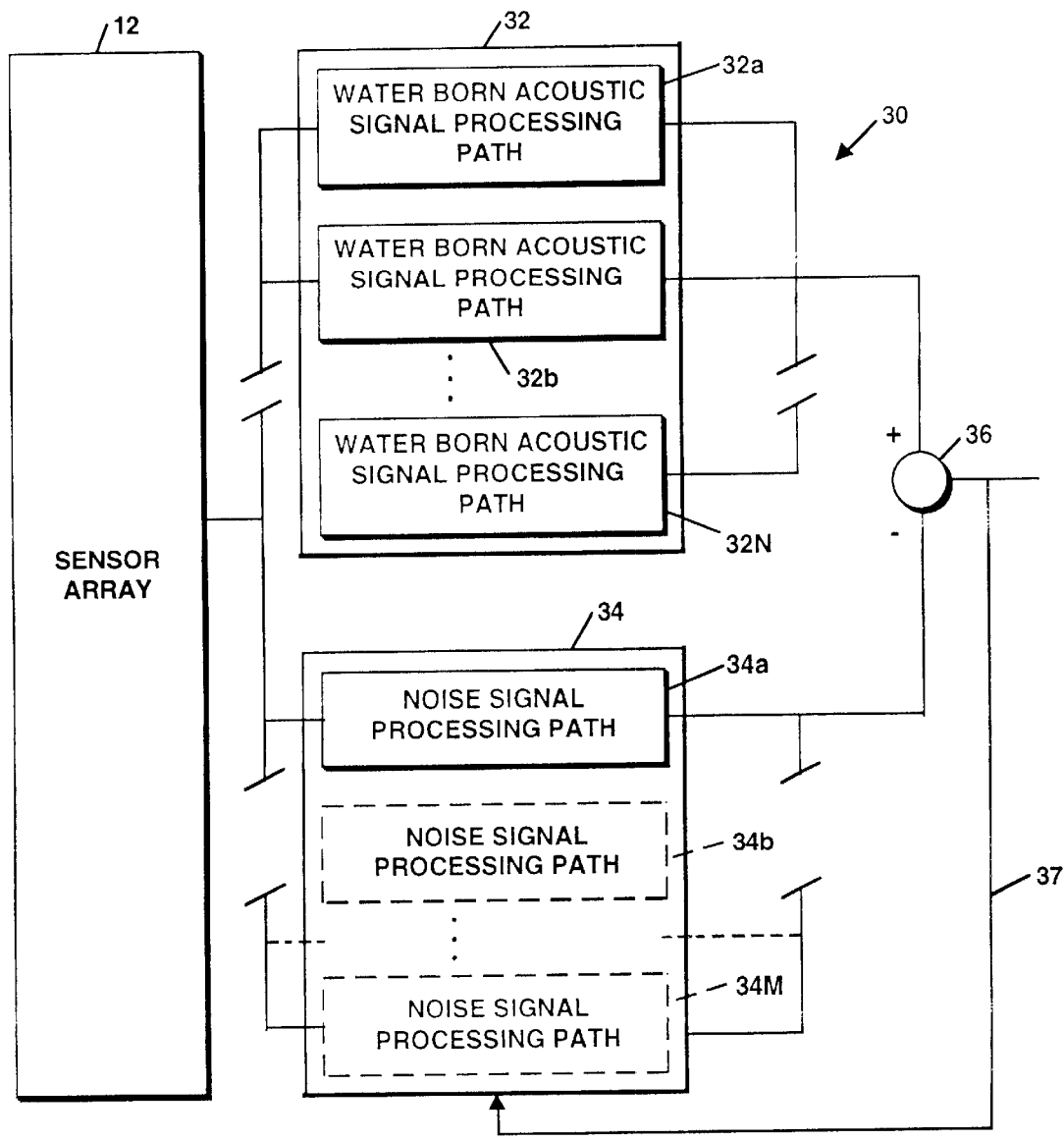
FIG. 2 is a block diagram of a non-acoustic self-noise canceller coupled to a sensor array.

Referring now to FIG. 2, a signal detection system 30 includes a sensor array 12, which may be of one of the types described above in conjunction with FIG. 1, coupled to an acoustic signal path 32 and a noise processing signal path 34. The acoustic signal processing path is provided from a plurality of channels 321–32N. Each of the channels 32a–32N apply a predetermined weighting to signals fed thereto to form beams.

The noise signal path 34 includes a first channel 34a and may optionally include channels 34b–34M. In the case where the noise path 34 includes the single channel 34a, the noise channel 34a isolates the noise source in the same manner described above in conjunction with FIG. 1. The isolated noise is then removed from the signal provided at the output of the acoustic signal processing path via combiner circuit 36 as also described above in conjunction with FIG. 1.

In the case where the noise path 34 includes multiple channels 34a–34M, the noise channels 34a–34M isolate the noise source in the same manner as outlined above for channel 34a except than channels 34b–M would have weighting coefficients corresponding to different non-acoustic phase speeds.

Figure 3:
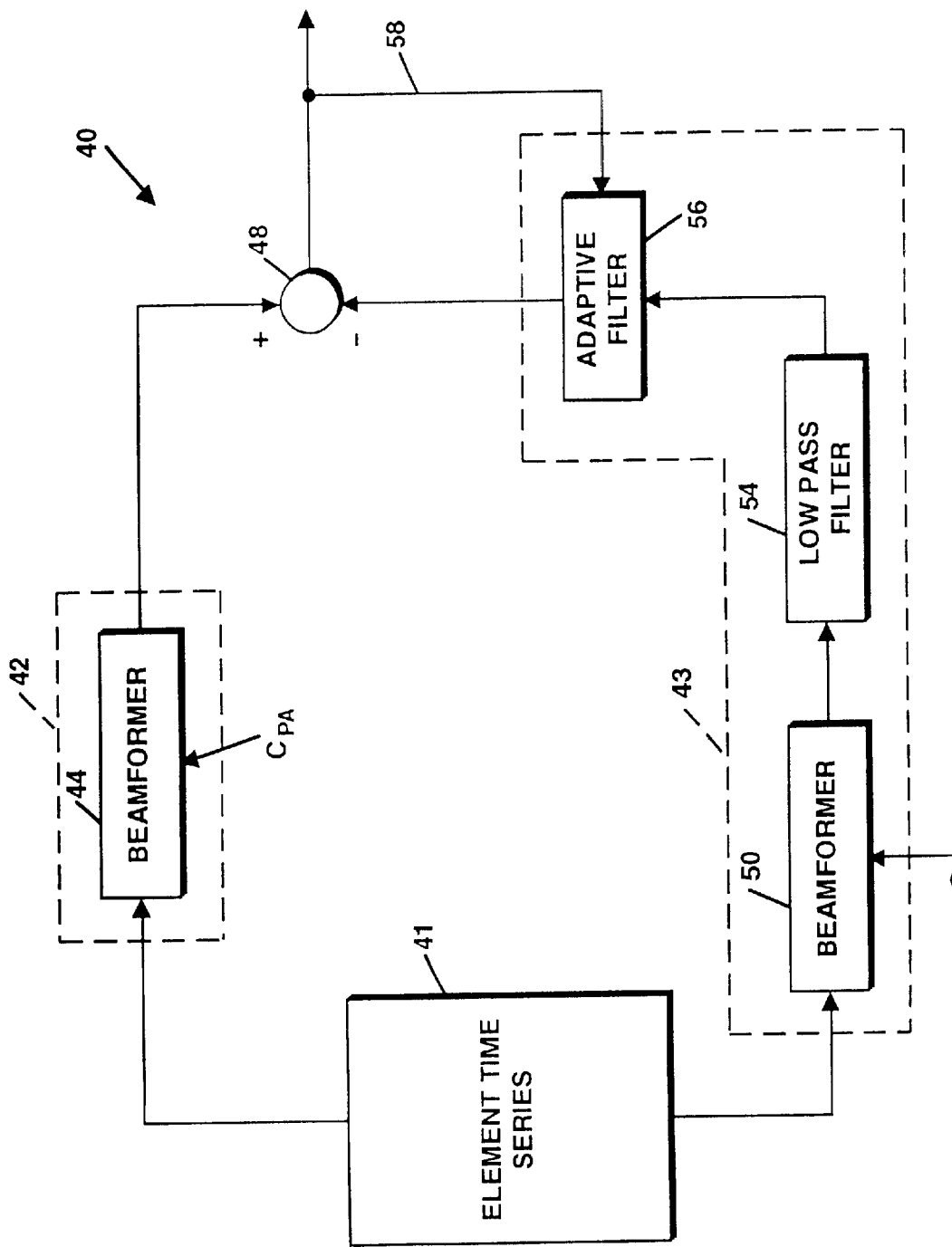
FIG. 3 is block diagram of an adaptive sidelobe canceller.

Referring now to FIG. 3, an adaptive sidelobe canceller 40 includes an element time series 41 coupled to both a primary signal path 42 and a reference signal path 43. The element time series 41 may be provided for example as a plurality of signal detecting devices such as sensors 13a–13i (FIG. 1) which comprise a sensor array such as sensor array 12 described above in conjunction with FIG. 1. The element time series 41 provides identical signals to both the primary and reference signal paths 42, 43.

The primary signal path 42 includes a conventional or adaptive beamformer 44 which receives a signal from the element time series 41 at a first port and forms a particular one of a plurality of possible beams via appropriate weighting of the signals fed thereto. In accordance with the present invention, the appropriate weighting is computed utilizing a value $C_{PA}$ which represents the speed at which the acoustic signal of interest travels in the medium in which the element time series 41 is disposed. The second end of the primaery signal path 42 is coupled to a first input port 48a of a combiner circuit 48.

The secondary signal path 43 includes a conventional or adaptive beamformer (CBF) 50 which receives a signal from the element time series 41 and forms a particular one of a plurality of possible beams via appropriate weighting of the signals fed thereto. In accordance with the present invention, the appropriate weighting is computed utilizing a value $C_{PN}$ which represents the speed at which the non-acoustic self-noise signal of interest travels in the medium in which the element time series 41 is disposed.

In one particular embodiment, the time element series 41 are disposed in water and the $C_{PA}$ parameter is provided having a value typically of about 1478 m/s while the $C_{PN}$ parameter is provided having a value typically less than 1478 m/s. As mentioned above the values of $C_{PA}$ and $C_{PN}$ are used to compute the weights used in the beamformer circuits 44, 50 respectively.

An output of the beamformer circuit is coupled to an input of a low pass filter 54 and an output of the low pass filter 54 is coupled to an input of an adaptive filter 56. The low pass filter 54 is provided having a pass band characteristic which attenuates signals having a frequency characteristic which is high relative to desired signals of interest. The LPF is aimed at filtering any spatially aliased artifacts than may result from beamforming into non-acoustic space. The output of the adaptive filter 56 is coupled to a second input 48b of the combiner circuit 48. The summing circuit 48 subtracts or otherwise combines the signals fed to the two inputs 48a, 48b and provides an output signal at an output port 48c. The signal at output port 48c thus corresponds to an acoustic signal having a substantial portion of the non-acoustic self-noise removed therefrom. The adaptive filter output may also be fed back into the beamformer circuit 50 in such a way as to modify the weights which isolate the non-acoustic noise reference in response to changing environmental conditions, e.g. via feedback signal path 58.

Figure 4:
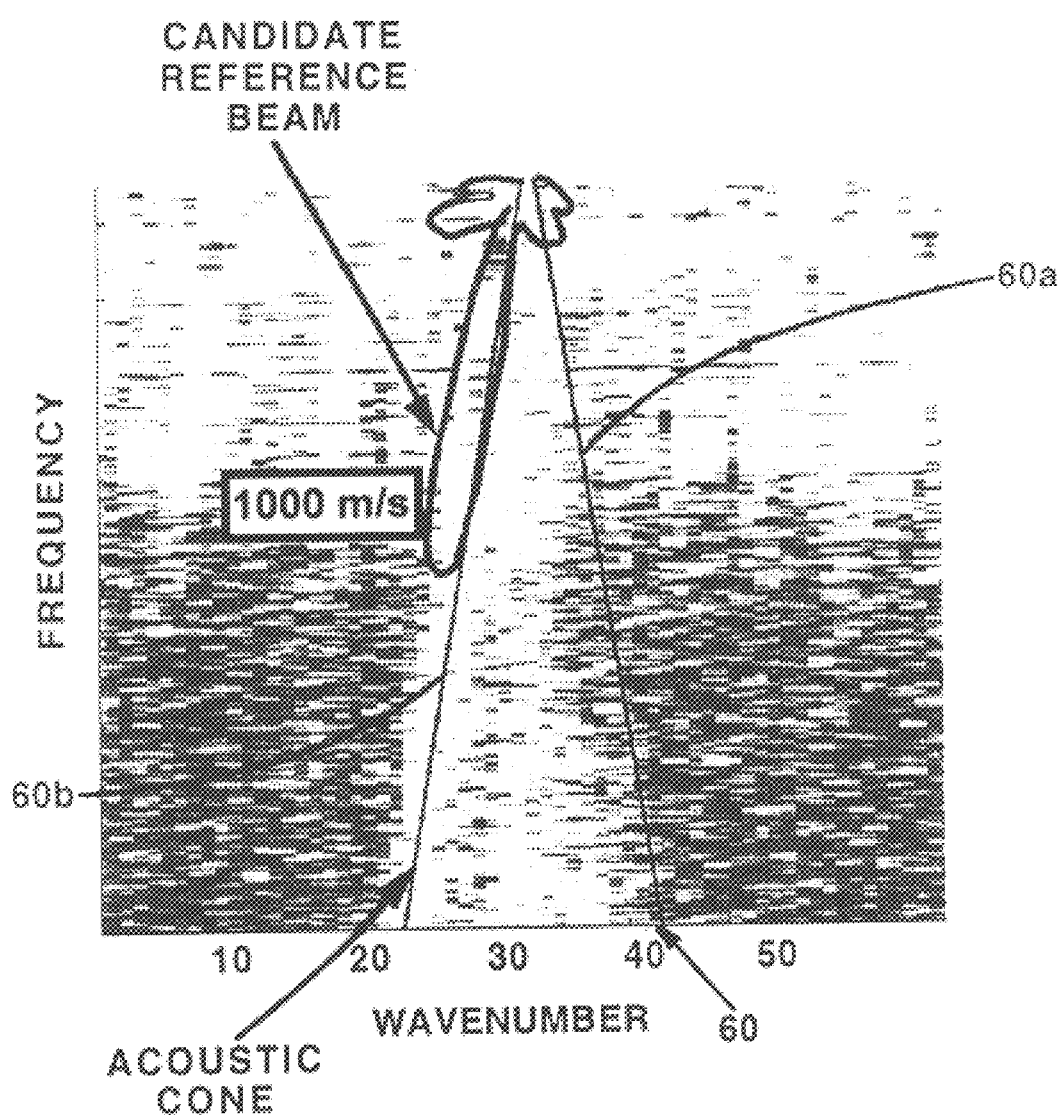
FIG. 4 is a κ-ω plot for a short aperture array showing a candidate reference beam steered to non-acoustic space.

Referring briefly to FIG. 4, one key to the present invention lies in the formation of the secondary signal path 43 (a.k.a. the interference reference signal path) by steering a beam to non-acoustic κ-ω space to make available a signal-free interference reference. In particular, the k-ω plot of FIG. 4 shows an acoustic cone 60 defined by sides 60a, 60b. The acoustic cone is the locus of points to which water-borne signals are confined on a "k-w" plot. A candidate reference beam 62 is disposed to left of side 60b, or to right of side 60a, of the acoustic cone 60. In this particular example, the illustrated acoustic cone 60 and candidate reference beam 62 are for a short aperture array.

As can be seen in FIG. 4, the reference beam 62 is disposed outside of the cone 60. In this manner, non-acoustic self-induced noise is received via the beam 62 while the signal of interest is received in the cone 60.

Referring again to FIG. 3, the adaptive filter 56 may be implemented in a conventional manner such as with a tapped delay line having filter weights updated via a least-mean-square (LMS) processing technique. The number of delay line taps is a function of the interference bandwidth and the sample rate of the time series. The adaptivity coefficient, $\mu$, is inversely related to the sum of the power in the filter taps. In a preferred embodiment, these parameters were empirically tuned to balance the misadjustment level, or ratio of excess mean-squared-error to minimum mean-squared-error against the convergence time. Filter weights may also be updated using any number of well-known techniques including but not limited to recursive least squares (RLS) or adaptive wiener filtering.

In the formation of an interference reference, the potential for a signal of interest to contaminate the reference channel is clearly of concern. In the case of a reference beam steered to non-acoustic space, as shown in FIG. 4, this potential can be quantified by considering the phase speed dependence of the array beam pattern.

Figure 5:
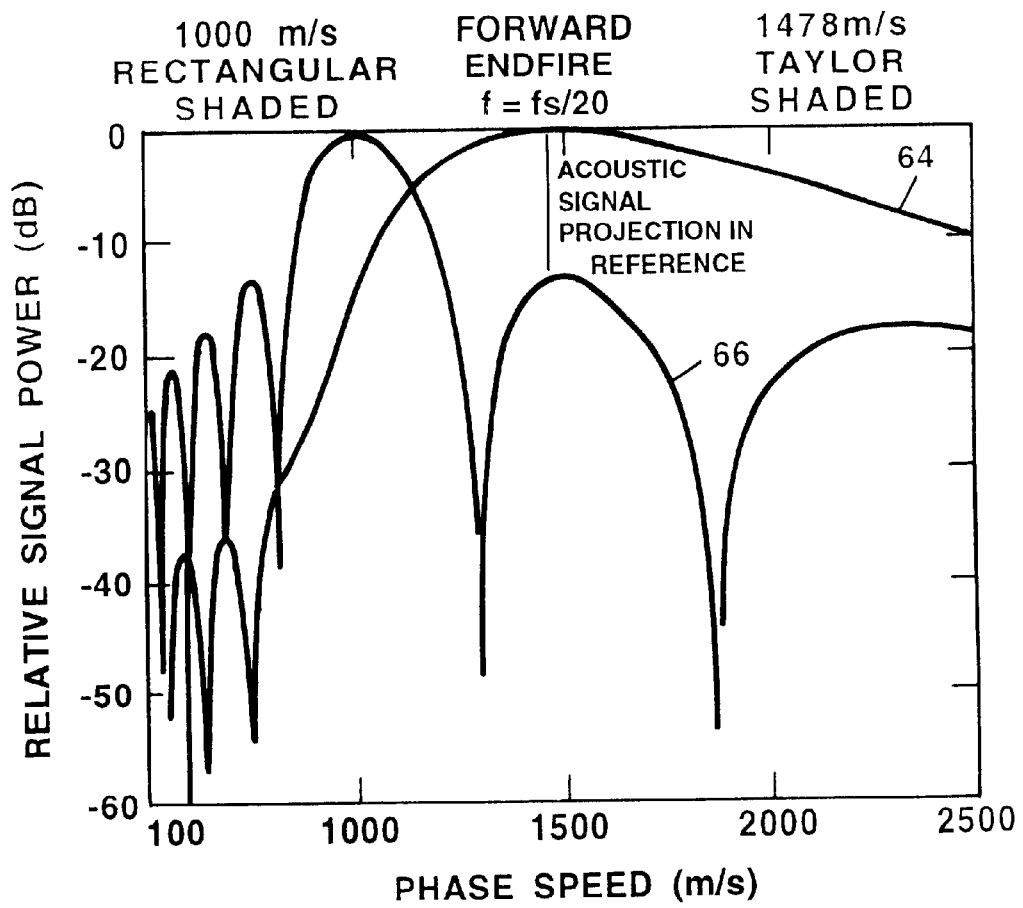
FIG. 5 is a plot of a beam pattern versus phase speed for a frequency within the bandwidth of the cable strum interference.

FIG. 5 is a plot of a beam pattern versus phase speed for a frequency within the bandwidth of the cable strum interference. At this frequency, acoustic signals propagating at 1478 m/s in the water column will contribute to the non-acoustic reference via the first sidelobe at −13 dB. This level of rejection is generally sufficient to prevent signal of interest (SOI) cancellation of most quiet targets. Well-known adaptive techniques can also be used to further improve the sidelobe response of the non-acoustic reference beam and minimize the leakage of SOI into the reference channel.

When an array is subject to hydrodynamic flow with a component normal to its axis, a wake is formed. When the velocity of the flow increases beyond a certain threshold, eddies, or vortices, begin to form and separate from the wake. Eventually these vortices shed from the wake in an asymmetric fashion. This asymmetric shedding imparts an oscillatory lift force locally on the array which, depending on the properties of the array such as tension and density, can excite transverse vibrations which propagate along the array axis. The frequency of vortex shedding in hydrodynamic flow is related to properties of the flow and the array via the empirically determined Strouhal relation:

$$f_s = \frac{Sv}{d},$$

where:

S is the Strouhal number;

v is the velocity of flow normal to the array axis; and d is the cable diameter.

It should be noted that S is equal to 0.21 in the laminar flow regime characteristic of most towed array environments,. Note that the normal component of velocity of flow can vary with time in response to platform motion and local inhomogeneities in the turbulent medium.

The transfer function to which the Strouhal excitation is applied is governed by the wave equation subject to the boundary conditions of the array under tow. For example, assuming fixed boundary conditions for the array, the preferred frequencies of vibration or modes of the array corresponding to the solution of the wave equation is given by:

$$f_n = \frac{n}{2L}\sqrt{\frac{T}{m_c}},$$

where:

T is cable tension;

$m_c$ is mass per unit length of the cable; and

L is the cable length.

Cable strum due to vortex shedding is strongly excited when the Strouhal excitation frequency is closely aligned with a resonant mode of the cable transfer function.

The decomposition of an array snapshot into its constituent acoustic and non-acoustic components is accomplished using a wavenumber-frequency, or k-ω, transform. The k-ω transform is a two-dimensional Fast Fourier Transform (FFT) in space and time. Maximum unambiguous wavenumber resolvable is equal to π/d, where d is the sensor spacing. Resolution in wavenumber is governed by the aperture length, L. For non-dispersive propagation, frequency and wavenumber are linearly related via $$k(f) = \frac{2\pi f}{c_p},$$

where:

$c_p$ equals the phase speed of the wavefront.

Figure 6:
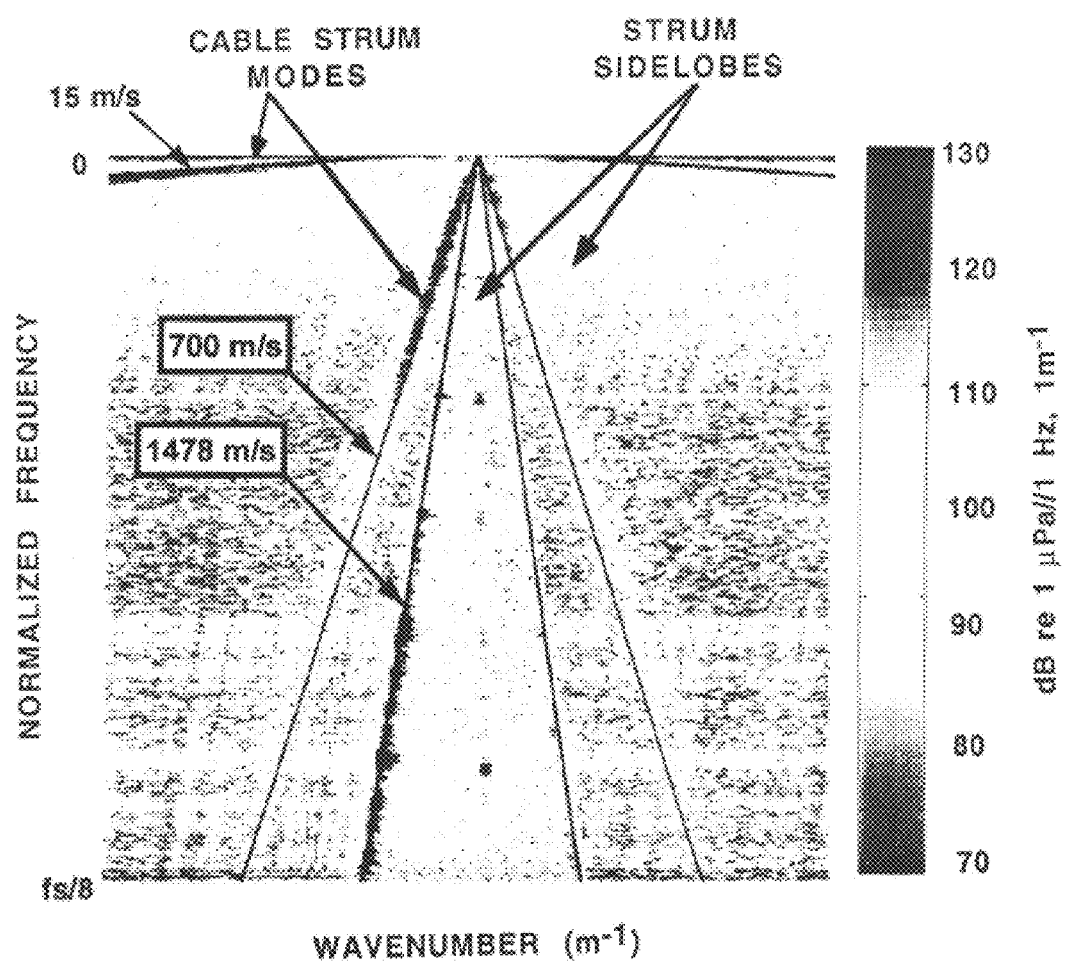
FIG. 6 is a k-ω plot for a good towed array.
Figure 7:
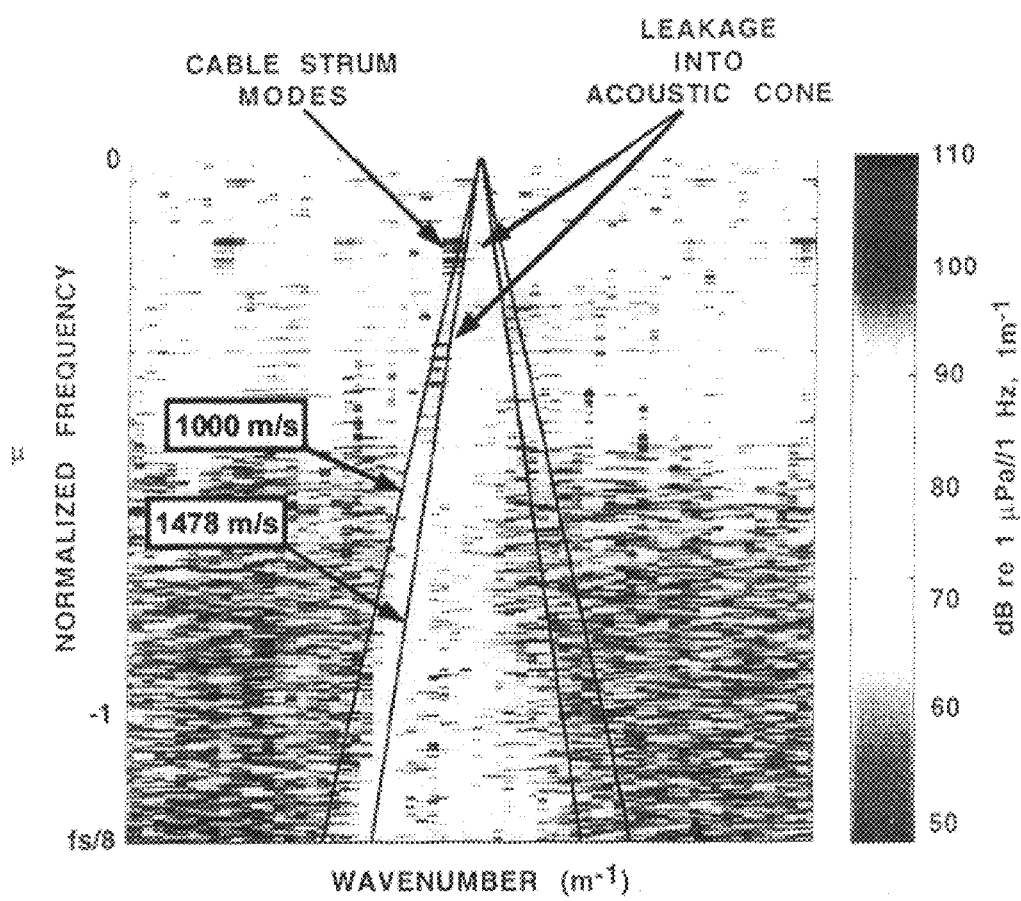
FIG. 7 is a k-ω plot for a problem towed array.

Referring now to FIGS. 6 and 7, a pair of k-ω plots for two towed arrays are shown. The arrays differ in a number of ways including aperture length, number of hydrophones, spatial sampling interval, cross-section, and the degree of mechanical vibration isolation employed. The k-ω plot associated with the first array (FIG. 6) exhibits much superior resolution relative to that of the second, due to its greater length and number and density of hydrophones. In both FIGS. 6 and 7, the water-borne acoustic cone is delineated by the innermost pair of black lines. These lines intersect at coordinates (k,ω) equal to (0,0). For non-dispersive propagation, wavenumber and frequency are linearly related via the phase speed of the wavefront. Thus, signals propagating in the water column at or near 1478 m/s, the nominal speed of sound in water, are constrained to lie along lines within the water-borne acoustic cone. Higher wavenumber modes associated with vibrations, or non-acoustic signals, propagating at lower phase speeds fall outside the acoustic cone.

FIG. 6 clearly depicts two discrete vibrational modes with phase speeds of 15 m/s and 700 m/s, respectively, occurring in the long aperture array at the onset of a turn. It should be noted that there is good separation between these modes and the acoustic cone. There is some sidelobe penetration (as indicated by the yellow "stripes" in FIG. 6) into the acoustic cone of energy from these modes, but it is relatively weak.

FIG. 7, on the other hand, depicts a much different situation for the short aperture array. A vibrational mode is observed to reside just outside the acoustic cone, (as indicated by the yellow "stripes" in FIG. 7) at a phase speed of approximately 1000 m/s. The poor separation means significant mainlobe leakage of the non-acoustic interference into forward endfire, in addition to the usual sidelobe leakage which typically penetrates all of bearing space. Mainlobe and sidelobe leakage of mechanical vibrations into the water-borne acoustic cone is the principal mechanism whereby non-acoustic noise impacts noise levels in beamformed towed array data.

Figure 8:
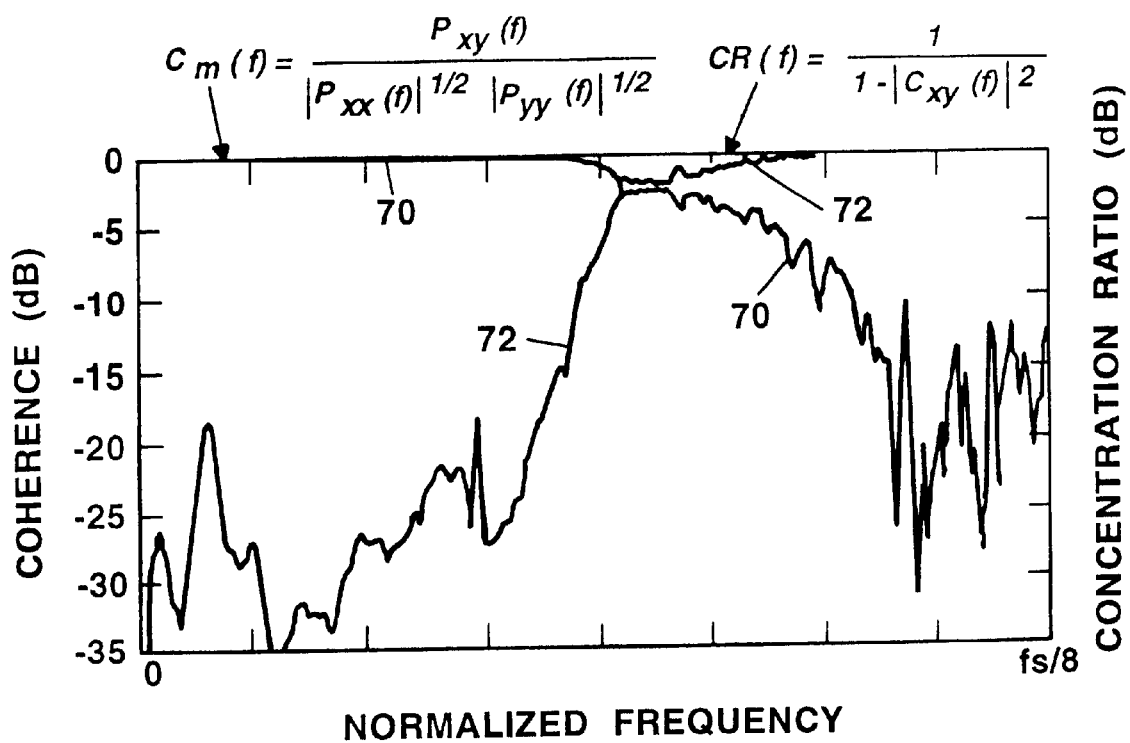
FIGS. 8 and 8A, are plots of the coherence between primary and reference channels, and before and after performance snapshots, for an eight minute segment of data from a short aperture array.

Referring now to FIG. 8 a plot of the coherence between primary and reference channels for an eight minute snapshot of data from the short aperture array. Coherence is defined as the normalized cross-spectrum which can be computed as:

$$C_{xy}(f) = \frac{P_{xy}(f)}{|P_{xx}(f)|^{1/2}|P_{yy}(f)|^{1/2}}$$

in which $C_{xy}(f)$ corresponds to normalized cross spectrum between channels x and y $C_{xy}(f)$ corresponds to cross spectrum between channels x and y $P_{xx}(f)$ corresponds to power spectrum of channel x $P_{yy}(f)$ corresponds to power spectrum of channel y where x is the acoustic channel of interest and y is the reference channel.

For interference cancellation to be supported, there must be significant coherence between the interference as sampled by the reference channel and the manifestation of the interference in the primary, in this case the forward endfire acoustic beam. Curve 70 in FIG. 8 shows that coherence is nearly perfect over the bandwidth of the cable strum, 0 to fs/4. After fs/4, the coherence degenerates as shown in FIG. 8. An additional measure of expected cancellation performance is represented by the cancellation ratio, CR, which is a function of the coherence spectrum given by, $$CR(f) = \frac{1}{1 - |C_{xy}(f)|^2}$$

The cancellation ratio (CR) supported by the coherence spectrum illustrated as curve 72 in FIG. 8 ranges from 15 to 30 dB over the bandwidth of the cable strum interference (i.e. 0 to fs/4).

Figure 8A:
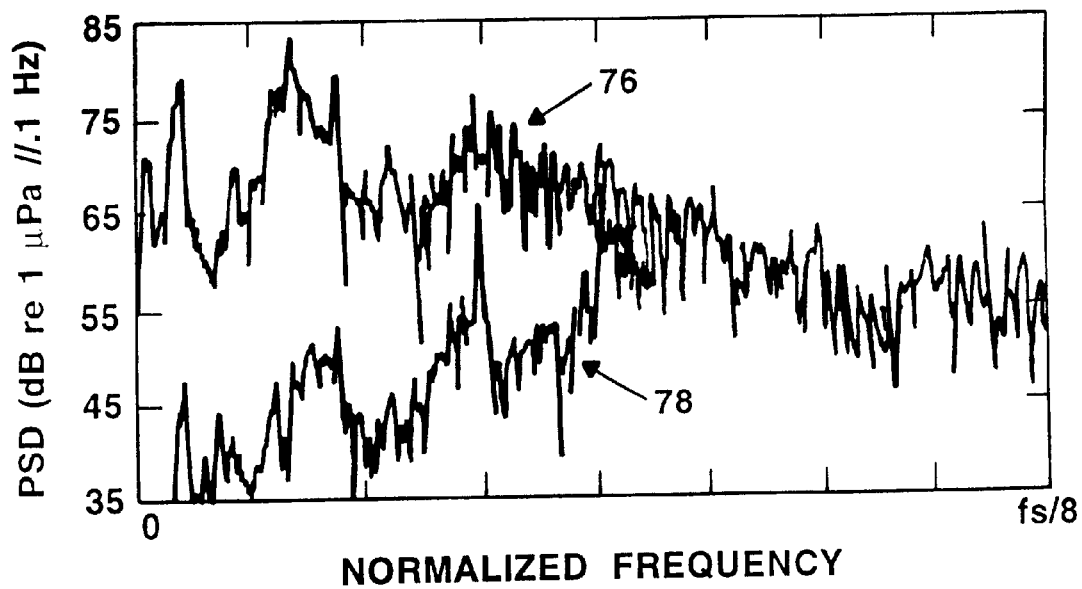

FIG. 8A depicts a time slice of the power spectrum for the short aperture array data corresponding to FIG. 8. The power spectrum density (PSD) of the forward endfire acoustic beam is plotted both before (curve 76) and after (curve 78) the adaptive strum cancellation technique. As can be seen in FIG. 8A, over the portion of the spectrum where the cancellation ratio predicted a 15–30 dB reduction in the cable strum noise floor, the PSD noise floor after strum cancellation is in fact decreased by a corresponding magnitude. It can also be seen that a narrowband signal at frequency 3 fs/64, detectable in the post-cancellation PSD, was completely buried in the self-noise floor prior to applying the adaptive sidelobe canceller technique.

Having described preferred embodiments of the invention, it will now become apparent to one of ordinary skill in the art that other embodiments incorporating their concepts may also be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A device for canceling non-acoustic self-noise in a towed sensor array comprising:
    an acoustic signal-processing path having an input coupled to said sensor array, said acoustic signal-processing path adapted to detect signals having a first predetermined phase speed;
    a noise signal processing path coupled to said sensor array, said noise signal processing path adapted to detect signals having a phase speed which is different than the first predetermined phase speed such that said noise signal processing path isolates vibrational noise from the sensor array;
    a combiner circuit having a first input coupled to an output of said acoustic signal-processing path and having a second input coupled to an output of said noise signal-processing path, said combiner circuit for combining an output signal of the noise signal processing path with an output signal of the acoustic signal processing path.

2. The device of claim 1 wherein said acoustic signal-processing path comprises a beamformer circuit.

3. The device of claim 2 wherein said an acoustic signal-processing path comprises a beam selection circuit.

4. The device of claim 1 wherein said noise signal-processing path comprises a beamformer circuit.

5. The device of claim 4 wherein said noise signal-processing path comprises a beam selection circuit.

6. The device of claim 5 wherein said noise signal-processing path comprises a low pass filter.

7. The device of claim 6 wherein said noise signal-processing path includes an adaptive filter having an input coupled to the output of said low pass filter and having an output coupled to an input of said combiner circuit.

8. The device of claim 1 wherein said combiner circuit includes:
    an adaptive filter having an input coupled to the output of said noise signal-processing path;
    a summing circuit having an input coupled to an output of said adaptive filter and having an output; and
    a feedback signal path coupled between the output of said summing circuit and a second input of said adaptive filter.

9. The device of claim 1 wherein said noise processor signal path is adapted to isolate signals having a phase speed less than 1478 m/s.

10. The device of claim 1 wherein said acoustic signal processor signal path is adapted to detect signals having a phase speed substantially equal to 1478 m/s.

11. The device of claim 1 wherein said sensor array corresponds to a sonar array.

12. A device for canceling non-acoustic self-noise in a sensor array comprises:
    a plurality of acoustic signal-processing paths, each of said plurality of acoustic signal-processing paths having an input coupled to said sensor array and each of said plurality of acoustic signal-processing path adapted to detect signals having a first predetermined phase speed;
    one or more noise signal processing paths, each of said one or more of noise signal processing paths coupled to said sensor array and adapted to detect signals having a phase speed which is different than the first predetermined phase speed such that each of said one or more noise signal processing paths isolates vibrational noise from said sensor array;
    a combiner circuit for combining an output signal of each of the one or more noise signal processing paths with a respective one of the output signals of the said plurality of acoustic signal processing paths.

13. The device of claim 12 wherein each of said plurality of acoustic signal-processing paths comprises acoustic signal weighting means for weighting signals with a first set of weighting coefficients, said first set of weighting coefficients selected to form a first beam to detect signals at a particular arrival angle relative to the sensor array.

14. The device of claim 12 wherein each of said one or more noise acoustic signal-processing paths comprises noise signal weighting means for weighting signals with a second different set of weighting coefficients, said weighting coefficients selected to isolate signals having a phase speed different than the phase speed of the signals detected by the beam formed by each of said plurality of acoustic signal-processing paths.

15. The device of claim 12 wherein said acoustic signal weighting means comprises a beam forming circuit.

16. The device of claim 12 wherein said noise signal weighting means comprises a beam forming circuit.

17. A method for canceling non-acoustic self-noise associated with vibrations in a sensor array, the method comprising the steps of:
    providing two or more signals from a sensor array to an input of an acoustic signal processing path;
    weighting the signal with a first set of weighting coefficients, said first set of weighting coefficients selected to form a first beam to detect signals at a particular arrival angle relative to the sensor array;

providing two or more signals from the sensor array to an input of a noise signal-processing path; and weighting the two or more signals with a second different set of weighting coefficients, said weighting coefficients selected to isolate signals having a phase speed different than the phase speed of the signals detected by the first beam.

18. The method of claim 17 further comprising the step of combining a signal received in the acoustic signal processing path with a signal received in the noise signal processing path.

19. The method of claim 18 wherein the step of combining the signal received in the acoustic signal processing path with the signal received in the noise signal processing path includes the step of removing the signal in the noise signal processing path from the signal in the noise signal processing path.

20. The method of claim 19 further comprising the step of filtering the signal in the noise signal processing path prior to the combining step.

* * * * *

UNITED STATES PATENT AND TRADEMARK OFFICE
CERTIFICATE OF CORRECTION

PATENT NO.     : 6,408,978 B1
DATED          : June 25, 2002
INVENTOR(S)    : Vincent E. Premus It is certified that error appears in the above-identified patent and that said Letters Patent is hereby corrected as shown below:

Column 8,
Line 59, delete "$C_{xy}(f)$...." and replace with -- $P_{xy}(f)$.... --.

Signed and Sealed this

Twenty-eighth Day of January, 2003

JAMES E. ROGAN
*Director of the United States Patent and Trademark Office*